United States Patent [19]

Von Schriltz

[11] 4,289,055

[45] Sep. 15, 1981

[54] ROTARY DIE ANVIL

[76] Inventor: Don F. Von Schriltz, 1747 Pomeroy St., Santa Clara, Calif. 95051

[21] Appl. No.: 110,118

[22] Filed: Jan. 7, 1980

[51] Int. Cl.³ .......................... B23D 25/12; B26D 1/40

[52] U.S. Cl. .......................................... 83/659; 83/347; 83/506

[58] Field of Search ................. 83/659, 347, 505, 506, 83/346, 348; 93/58.2 R, 58.2 F, 58 R

[56] References Cited

U.S. PATENT DOCUMENTS

| | | | |
|---|---|---|---|
| 2,628,681 | 2/1951 | Kane | 83/ |
| 2,687,069 | 4/1951 | Burger et al. | 93/57 |
| 3,664,240 | 5/1972 | Helm | 93/58.1 |
| 3,677,122 | 7/1972 | Rautine | 83/506 |
| 3,823,633 | 7/1974 | Ross | 83/346 |
| 3,965,786 | 6/1976 | D'Luhy | 83/346 |
| 4,073,208 | 2/1978 | Kirkpatrick . | |

*Primary Examiner*—Donald R. Schran
*Attorney, Agent, or Firm*—Phillips, Moore, Weissenberger, Lempio & Majestic

[57] ABSTRACT

An improved rotatable anvil is provided. The anvil is of the type useful to cooperate with a rotatable die cylinder in manufacturing paper blanks and the like. The anvil comprises compressible first (inner), hard second (intermediate) and hard third (outer) concentrically disposed and axially extending layers interbonded upon a core thereof. The second and third layers are of different hardnesses. The anvil is made by providing a hollow cylindrical shell, mounting the shell concentrically about the core, injecting a polymerizable fluid between the shell and core assemblage and holding the mounted assemblage for a time sufficient for substantially complete polymerization.

6 Claims, 4 Drawing Figures

ROTARY DIE ANVIL

DESCRIPTION

Technical Field

The present invention relates to a rotatable anvil and method for making the anvil, which anvil cooperates with a rotatable die cylinder, such as is used for feeding corrugated paper, chipboard and the like therethrough to provide paper blanks for packaging and the like.

BACKGROUND OF THE INVENTION

The finishing for corrugated paper, chipboard and other papers useful for packaging usually includes punching and cutting to provide paper blanks which then may be further assembled as cardboard boxes, various packaging boxes and the like. Two general types of die cutters for such punching and cutting processes are known. The first type is platen-type die cutters. The second type is rotary die cutters.

Platen die cutters have frequently been utilized rather than rotary die cutters because of superior accuracy. This accuracy is obtained at the expense of productivity because of the reciprocating stop and start activity of the blank and platen. Rotary die cutting has been limited in its accuracy, primarily due to uneven wear of the anvils and due to the tendency of the anvils to develop harmonic vibrations during use thereof.

Attempts to improve the quality of die cuts from rotary die cutting have been made for several years by attempting to adapt steel-to-steel die cutting methods to rotary machines. These attempts have largely not been accepted in this country because of the extreme accuracy required of the die boards. Such accuracy has meant that the die board manufacturing costs are quite high.

One attempt to provide steel-to-steel die cutting is disclosed by U.S. Pat. No. 3,823,633. An anvil roller thereof is cushioned by having a plurality of roller sleeve segments inserted beneath respective steel sleeve segments. However, a cutting roller for combination with this anvil roller requires various specialized die board arrangements, and is not adaptable to conventionally constructed die boards.

Accordingly, it is an object of the present invention to provide an improved anvil suitable for cooperation with a rotatable die cylinder having conventional die boards thereupon.

It is a further object of the present invention that use of the anvil thereof provides more accurate blanks therefrom. Such improved accuracy of blanks is particularly desirable, as the trend in the corrugated industry is towards the increasing use of automatic finishing and assembling stages.

SUMMARY OF THE INVENTION

In one aspect of this invention, an improvement in a cylindrical anvil of the type useful with a rotatable die cylinder having a die board with cutting knives thereupon is provided. The improvement comprises an integrally formed, longitudinally extending anvil having first (inner), second (intermediate) and third (outer) concentrically disposed and axially extending layers interbonded upon a core of the anvil. The second and third layers are both hard, but are of different hardnesses with the third layer being the harder. The third layer is coated upon the second layer. The second and third layers together are of a sufficient thickness to be radially inwardly deflectible, responsive to forces imposed by the die board cutting knives. The first layer is bondedly associated with and between the second layer and the core. The first layer has a bulk compliance which permits sufficient deflection of the second layer against the first layer.

In another aspect of the present invention, a method for making a cylindrical anvil comprises providing, mounting, injecting and holding steps. In the providing step, a hollow, cylindrical steel shell is provided. In the mounting step, the shell is mounted about a cylindrical core to define an annular chamber therebetween. In the injecting step, a liquid containing chemical species which react to form a long chain, cross-linked polymer is injected into the chamber. This is followed by holding the shell about the cylindrical core for a time sufficient for substantially complete polymerization of the polymer.

The above improved anvil and method thus provide for more accurate paper blanks to be produced therefrom, and further provide that conventional die boards may be used therewith.

BRIEF DESCRIPTION OF THE DRAWINGS

Other objects of this invention will become apparent from the following description and accompanying drawings wherein.

DETAILED DESCRIPTION OF THE PREFERRED EMBODIMENT

Figure 1:
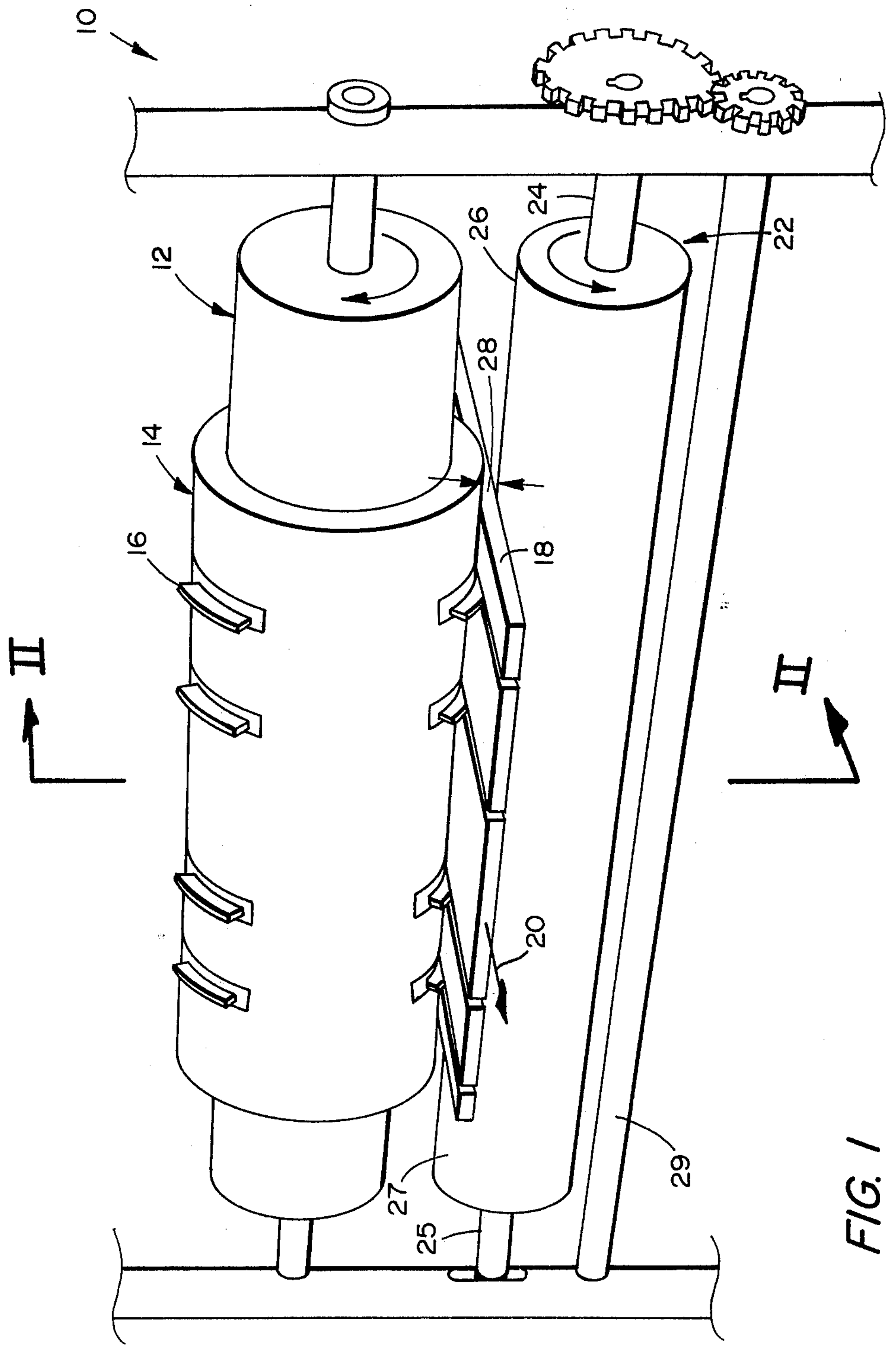
FIG. 1 is a perspective view of a die cutting apparatus employing the improved anvil of the present invention.

Referring to FIG. 1, a die cutting apparatus 10 is illustrated which includes a rotatably mounted die cylinder 12 having a die board 14 with cutting means 16 carried by the die board 14. The die board 14 is mounted upon the die cylinder 12 and is conventional.

The cutting means 16 are well known to include a variety of cutting structures for performing punching, scoring and the like on a web 18 of material. Web 18 is material, such as corrugated paper, chipboard or the like, illustrated as being fed by conventional means in the direction of arrow 20 between the die cylinder 12 and a cylindrical anvil 22. Anvil 22 is rotatably mounted by spools 24,25 extending outwardly from each end 26,27 of the anvil 22, and anvil 22 is spaced from the die cylinder 12. The spacing between the die cylinder 12 and the anvil 22 is an adjustable gap 28 which may be increased or decreased by means such as an adjusting shaft 29. The present invention is an improvement in the anvil 22 and is hereinafter referred to as an improved anvil embodiment 22.

Figure 2:
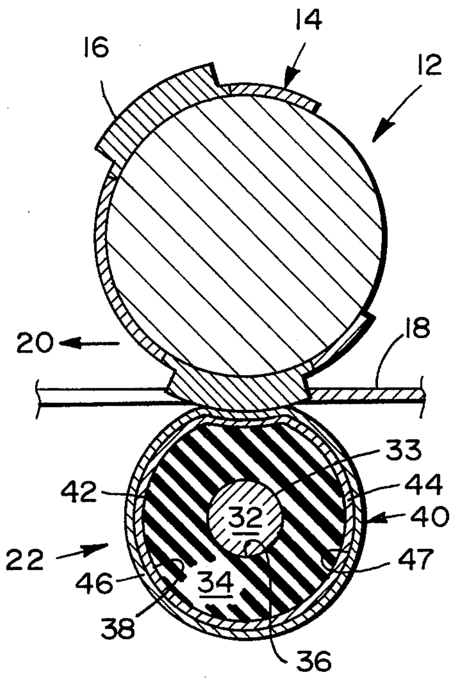
FIG. 2 is an enlarged, fragmentary sectional view taken along lines II—II of FIG. 1.

Turning to FIG. 2, anvil embodiment 22 comprises an axially extending core 32 which is a solid cylinder having a peripheral surface 33 and being formed of a strong material such as steel or the like. A compressible first layer 34 is concentrically disposed about and axially extending along substantially the entire length of the core 32. (The spools 24,25 illustrated in FIG. 1 may be an integral extension of core 32 beyond the first layer 34, or may be affixed to core 32) Thus, the first layer 34 extends radially outwardly from the core 32, and has an inner surface 36 and an outer surface 38. The inner surface 36 must be integrally bonded to the surface 33 of core 32, as will hereinafter be further described. The first layer 34 is composed of a long chain, cross-linked organic polymer such as polyurethane, having a Shore "A" hardness of about 60 to about 70.

A hard, relatively thin hollow cylindrical shell 40 has an inner surface 42 which is integrally bonded to the outer surface 38 of first layer 34. The shell 40 is thus concentrically disposed about and spaced from the core 32. The shell 40 axially extends substantially along the entire length of core 32. The shell 40 performs the functions of resisting penetration of the cutting means 16 and of distributing forces imposed by the cutting means 14 upon the improved anvil embodiment 22. The distributing property of shell 40 is more particularly provided by sufficient deflection of the shell 40 as follows.

Figure 3:
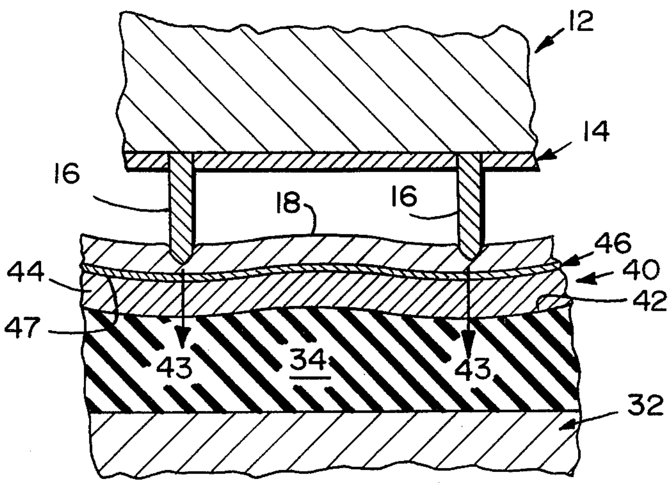
FIG. 3 is an enlarged, fragmentary view, with portions in section, of a detail of FIG. 1; and, FIG. 4 is a front elevational view illustrating a method of the present invention.

Turning to FIG. 3, the shell 40 is illustrated as being radially inwardly deflected (arrows 43) in response to forces imposed by the cutting means 16 of the die board 14. The construction of shell 40 includes a relatively thin layer of material, or second layer 44 which has sufficient elasticity and moment of inertia that it will radially inwardly deflect on the order of about 0.015 inches, yet return to its original, concentric form after the removal of the stress of the cutting means 16. The second layer 44 includes the inner surface 42 of shell 40. A preferred material for the second layer 44 is steel, more preferably mild steel, or steel alloys such as chrome-moly steel, in a thickness of from about 0.18 to about 0.25 inches. Mild steel is preferred over hardened steel as the hardening process tends to distort shell 40.

The penetration resisting function of the shell 40 is provided by a very hard, this third layer 46 which is coated upon an outer surface 47 of the second layer 44. The third layer 46 is concentrically disposed about the second layer 44 and axially extends substantially along the entire length of second layer 44. The third layer 46 should have a hardness of at least about 60 Rockwell C, and will normally have a thickness of about 0.004 inches. The third layer 46 is preferably predominantly composed of tungsten carbide, and may also include smaller amounts of cobalt and/or chromium. For example, the necessary hardness of the third layer 46 may be provided by compositions of from about 85 to about 91 weight percent tungsten carbide, from about 9 to about 15 weight percent cobalt, and from about 0 to about 4 weight percent chromium. This hard, thin coating must be integrally bonded to the second layer 44 to prevent chipping, flaking or the like during normal use of the improved anvil 22. Coating processes which provide sufficient bonding are commercially available, such as, for example, a Union Carbide "D-Gun" coating process.

The most favorable conditions for the die cutting apparatus 10 is whereby only enough force is applied from the cutting means 16 to the anvil 22 to sever the fibers in the web 18. The imposition of more force than necessary has tended in the past to lead to dulling of the cutting means 16, penetration of conventional anvils and uneven wear of such conventional anvils. Uneven wear causes skewing of the die board 14 and loss of accuracy in blanks produced therefrom.

The prior art anvils have attempted to utilize resiliently deformable materials to cushion, or modify, the fores imposed by cutting means thereupon. However, many of the prior cushioned anvils are not suitable for relatively thick, corrugated papers and have required relatively specialized die boards or have tended to warp, and have not found wide commercial acceptance.

Returning to FIG. 3, integral bonding between the first, second and third layers 34, 44, 46 and the core 32 substantially retards uneven wear or distortion of improved anvil 22 along substantially its entire length, and provides more accurate cutting of the web 18.

More particularly, the bonding of the first layer 34 to and between substantially the entire length of both the core 32 and the shell 40 allows the first layer 34 to damp harmonic vibrations which otherwise tend to develop in the core 32, and which have interfered with the cutting process of prior rotatable anvils.

Figure 4:
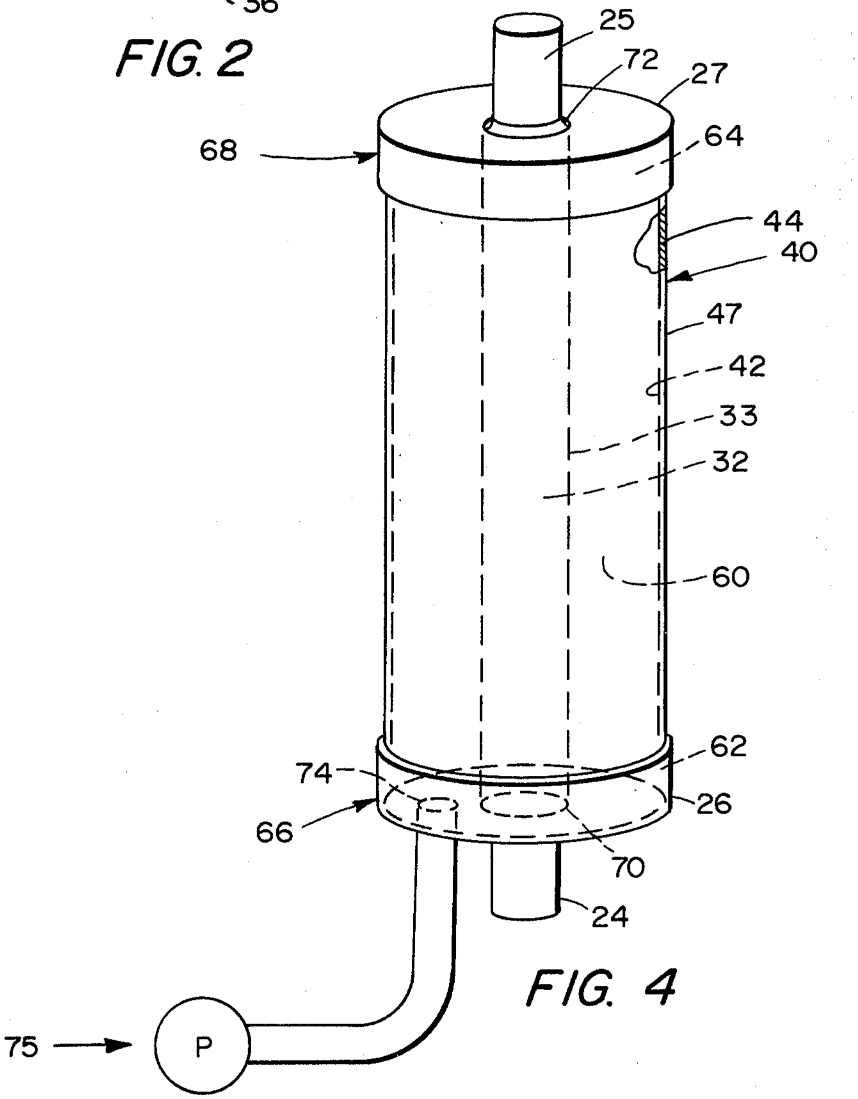

Referring to FIG. 4, a method for making the improved anvil embodiment 22 will now be described. A thin, hollow cylindrical steel shell, such as the shell 40 having the second layer 44 but initially without the harder third layer 46, is provided. The shell 40 is mounted exteriorly about a cylindrical core, such as the core 32, to be held concentric therewith and to define an annular, axially extending chamber 60 therebetween. The mounting includes closing the annular chamber 60 at ends 62,64 thereof, each of the ends 62,64 substantially being located at ends 26,27 of the anvil 22 with the spools 24,25 extending therefrom. Ends 62,64 are closed by means such as circular caps 66,68. The caps 66,68 each have a respective aperture 70,72 for closely receiving spools 24,25 therethrough. The cap 66 has an orifice 74 therethrough.

The mounting further holds the concentric shell and core 40,32 in a vertical position with the end 62 closed by cap 66 being downwardly facing and the end 64 closed by cap 68 being upwardly facing. Such vertical positioning may be accomplished by conventional hoists and the like, not herein illustrated. A predetermined volume of fluid containing chemical species which react to form an organic polymer, more particularly to form a polyurethane elastomer, is first degassed to eliminate air bubbles and is then injected through the orifice 74 and is flowed upwardly into the chamber 60. Such injection and flow may be accomplished by conventional pumping means, such as a positive displacement pump 75.

The liquid injected contains chemical species such as polyols and isocyanates in proportions sufficient to reactively form a polyurethane elastomer with a Shore "A" hardness of about 60 to about 70. The liquid may include additional materials such as plasticizers and the like as known in the art.

Prior to such injecting, it is preferred that the inner surface 42 of the shell 40 and the surface 33 of core 32 be treated as follows. The surfaces 33 and 42 are wiped or flushed clean with any of various commercially available solvents for removing dirt and grease. After cleaning, the surfaces 33,42 have applied thereto a surfactant which promotes bonding of the injected fluid to the surfaces 33,42 as the fluid polymerizes. Among suitable surfactants to promote bonding is, for example, "Thixon 1153" commercially available from Dayton Chemical Products, West Alexandria, Ohio.

During and following injection of the predetermined volume of degassed fluid (the predetermined volume being sufficient to entirely fill the chamber 60), the shell 40 is held mountedly about the core 32, the both being vertically oriented, for a time sufficient for complete polymerization of the fluid. Such sufficient time is about four hours. At the conclusion of the holding step, the caps 66,68 are removed.

The thus assembled shell 40, having the core 32, first layer 34 and second layer 44 in interbonded, concentric relationship, is then further treated as follows. The outer surface 47 of second layer 44 is ground to about 0.004" of the desired finished radius for anvil 22. The grinding assists in ensuring substantially perfect concentricity of second layer 44 about core 32. A very hard, thin coating is integrally bonded upon outer surface 47 to be concentrically about and axially extending substantially the entire length of second layer 44. This coating is the third layer 44, as has been previously described.

Other aspects, objects and advantages of this invention can be obtained from the study of the drawings, the disclosure and the appended claims.

I claim:

1. In a cylindrical anvil of the type useful with a rotatable die cylinder having a die board with cutting means thereupon, said anvil being rotatably mounted and spaced from said die cylinder, an improvement comprising:

an axially extending cylindrical core;

a compressible first layer being bonded to said core concentrically about and axially extending substantially the entire length of said core;

a hard second layer being bonded to said first layer concentrically about and axially extending along substantially the entire length of said first layer; and, a hard third layer concentrically disposed about and axially extending along substantially the entire length of said second layer, said second and third layers being of different hardnesses with said third layer being the harder and having a Rockwell C hardness of at least about 60, said third layer being coated upon said second layer, said second and third layers together being of sufficient construction to be radially inwardly deflectable responsive to forces imposed by said cutting means of die board, said first layer having a bulk compliance sufficient to permit the deflection of said second and third layers.

2. The improved anvil as in claim 1 wherein said first layer is polyurethane.

3. The improved anvil as in claim 1 or 2 wherein said third layer is an alloy having from about 85 to about 91 weight percent tungsten carbide, from about 9 to about 15 weight percent cobalt, and from about 0 to about 4 weight percent chromium.

4. The improved anvil as in claim 3 wherein said third layer is coated upon said second layer in a thickness of about 0.004 inches.

5. The improved anvil as in claim 4 wherein said second layer is a thickness of from about 0.18 to about 0.25 inches.

6. The improved anvil as in claim 4 wherein said second layer is formed of steel.

* * * * *